United States Patent [19]

Oka

[11] Patent Number: 5,006,176

[45] Date of Patent: Apr. 9, 1991

[54] COAGULANT FOR SOIL AND/OR SAND METHOD FOR PREVENTING WASHOUT USING THE SAME

[75] Inventor: Yoshiyuki Oka, Fuchu, Japan

[73] Assignees: Shiro Sejima; Yoshiyuki Oka; Ken Murata, all of Tokyo, Japan

[21] Appl. No.: 500,251

[22] Filed: Mar. 27, 1990

[30] Foreign Application Priority Data

Apr. 5, 1989 [JP] Japan .................. 1-84770

[51] Int. Cl.$^5$ .......................................... C04B 12/04
[52] U.S. Cl. ................... 106/633; 106/607; 106/609; 106/720; 106/900
[58] Field of Search ............... 106/900, 76, 81, 84, 106/93, 607, 609, 633, 720

[56] References Cited

U.S. PATENT DOCUMENTS

| | | | |
|---|---|---|---|
| 4,083,407 | 4/1978 | Griffin, Jr. et al. | 106/81 X |
| 4,293,340 | 10/1981 | Metz | 106/900 X |
| 4,425,165 | 1/1984 | Bryhn et al. | 106/900 X |
| 4,545,820 | 10/1985 | Mallow | 106/76 |
| 4,663,067 | 5/1987 | Mallow et al. | 106/900 X |

*Primary Examiner*—Karl Group

*Attorney, Agent, or Firm*—Wenderoth, Lind & Ponack

[57] ABSTRACT

The present invention relates to a coagulant for soil and/or sand and method for preventing washout using the same. The coagulant comprises approximately 10 parts by weight of carboxymethylcellulose, approximately 10 parts by weight of calcium chloride, approximately 10 parts by weight of sodium metasilicate powder, 0.3 to 100 parts by weight of silicon dioxide and 1 to 300 parts by weight of calcium carbonate. The method for preventing washout comprises the steps of scattering the coagulant over the surface of the soil and/or sand in a manner such that 360 to 1000 g of the coagulant is applied to a volume of surface area of 1 m$^2$ and a depth of 10 cm, and excavating the soil and/or sand to a depth of 5 to 20 cm and mixing the coagulant and the soil and/or sand while adjusting water content of the soil and/or sand in the range of 30 to 45%. In the method, a part of —OH of cellulose in carboxymethylcellulose is denatured into —OCH$_3$ which is soluble in water and highly adhesive. The carboxymethylcellulose is uniformly sunk in the soil, and the cellulose molecules form bundles with one another and form a micellar array, thereby preventing water molecules from entering into the soil.

4 Claims, 3 Drawing Sheets

COAGULANT FOR SOIL AND/OR SAND METHOD FOR PREVENTING WASHOUT USING THE SAME

BACKGROUND OF THE INVENTION

The present invention relates to a coagulant for soil and/or sand and method for preventing washout using the same, and more particularly to a coagulant for soil and/or sand which is employed to prevent washout, and to a method for preventing washout of soil and/or sand using the coagulant in which the coagulant is added to the soil and/or sand at a construction site, thereby preventing washout of the soil and/or sand in a short time.

In Japan which has a lot of volcanoes, there are a lot of volcanic ash layers in which a loamy layer is a typical example. The loamy layer contains an approximately equal amount of small grains of sand, silt and clay. Therefore, the loamy layer becomes self-adhesive when highly saturated, and becomes powdery to the contrary when dry. These properties of the loamy layer are changed in accordance with regions in which the layers are located The loamy layer which is hard does not drain very well. The loamy layer in a mountainous region is made soft by weathering. If it rains on the loamy layer, the loamy layer becomes colloidal by containing water. The loamy layer located at a slope may slide due to weight thereof, resulting in a landslide. There are a lot of landslide regions in Japan at which several barriers made of concrete are constructed.

When it is raining steadily and a surface layer at the slope contains a lot of water beyond a certain amount, the surface layer becomes colloidal, thus decreasing internal friction of the layer. Therefore, the surface layer at the slope begins to slide in a considerable thickness due to the weight thereof. Consequently a mud slide may flow over the barriers, or sweep away the barriers. In the regions where occurrences of the landslide are unexpected, roads are often buried underneath the soil and sand brought down by the landslide and it is difficult to take emergency measures to prevent the occurrence of the landslide. That is, when constructing the barriers made of cement concrete, it is time-consuming and requires many processes which includes solidifying the foundation, providing molds, supplying concrete milk into the molds, and curing the concrete for more than three days at least until the cement solidifies. Especially, in the mountainous regions, aggregates for concrete must be transported to the construction site, which is very troublesome. Further, trucks for transporting aggregates are often brought to a standstill due to slippage by mud. Therefore a basic solution to the problems has been sought for a long time.

SUMMARY OF THE INVENTION

It is an object of the present invention to provide a coagulant for soil and/or sand and method for preventing washout using the same which are capable of solidifying a mud flow using soil and/or sand in the construction site in a short time.

According to a first aspect of the present invention, there is provided a coagulant for soil and/or sand comprising: approximately 10 parts by weight of carboxymethylcellulose; approximately 10 parts by weight of calcium chloride; approximately 10 parts by weight of sodium metasilicate powder; 0.3 to 100 parts by weight of silicon dioxide; and 1 to 300 parts by weight of calcium carbonate.

According to a second aspect of the present invention, there is provided a method for preventing washout of soil and/or sand using a coagulant, the method comprising the steps of: preparing a coagulant by premixing approximately 10 parts by weight of each of carboxymethylcellulose, calcium chloride and sodium metasilicate powder, 0.3 to 10 parts by weight of silicon dioxide and 1 to 15 parts by weight of calcium carbonate; scattering the coagulant over the surface of the soil and/or sand in a manner such that 360 to 1000 g of the coagulant is applied to a volume of surface area of 1 $m^2$ and a depth of 10 cm; and excavating the soil and/or sand to a depth of 5 to 20 cm and mixing the coagulant and the soil and/or sand while adjusting water content of the soil and/or sand in the range of 30 to 45%.

As mentioned above, the loam contains a mixture of sand, silt and clay. Therefore, the loam has bad water permeability, and water stays on the loamy layer after a rainfall and sinks into the loamy layer gradually as time elapses.

Accordingly, when the ground is firm and the loamy layer, upper layer of the ground, contains a certain amount of water, or when the ground is firm and water stays on the loamy layer, the loamy layer becomes fluid like starchy syrup. On the other hand, when the ground is soft, not only the loamy layer but also the soft ground becomes fluid like starchy syrup.

In the landslide regions having a surface layer, on the firm ground, containing a lot of silt, large grains of sand and a little clay, the coagulant according to the present invention is effective to improve fluidity of the surface layer. That is, the coagulant is scattered over the surface layer and then the surface layer is excavated and mixed with the coagulant and thereafter the surface layer is leveled, thereby coagulating the soil of the surface layer and decreasing fluidity of the soil that had been caused by the water contained therein.

This is because a part of —OH of cellulose in carboxymethylcellulose is denatured into —OCH$_3$ which is soluble in water and highly adhesive. The carboxymethylcellulose is uniformly sunk in the soil, and the cellulose molecules form bundles with one another and form a micellar array, thereby making fine crystals. Therefore, there is no clearance in the micellar array into which water molecules can enter. Even if the soil contains a little clay, since particles of sand, silt and clay are combined with one another, water cannot be easily sunk in the soil, thereby eliminating fluidity.

The calcium chloride effects a rapid combining action which combines calcic and siliceous material, so that the solidifying time of the soil after construction can be shortened.

The sodium metasilicate is hydrolyzed to form syrup and seeps in between ingredients of the soil, so that the sodium metasilicate promotes hydrogen bonding and effects coagulating action of the soil.

The silicon dioxide and the calcium carbonate adjust the pH of the acidic soil, and promote rapid hydrogen bonding and coagulate the soil in cooperation with the action of calcium chloride in a mixed state with the soil.

The above and other objects, features and advantages of the present invention will become apparent from the following description when taken in conjunction with the accompanying drawings in which preferred embodiments of the present invention are shown by way of illustrative examples.

DETAILED DESCRIPTION OF THE PREFERRED EMBODIMENTS

A coagulant for soil and/or sand and method for preventing washout using the same according to embodiments of the present invention will be described below with reference to FIGS. 1 through 3.

First, compositions of a coagulant for soil and/or sand are illustrated in the table which follow;

| Example 1 | | |
| --- | --- | --- |
| Carboxymethylcellulose | 10 | parts by weight |
| Calcium chloride | 10 | parts by weight |
| Sodium metasilicate powder | 10 | parts by weight |
| Silicon dioxide | 0.3 | parts by weight |
| Calcium carbonate | 1 | parts by weight |
| Example 2 | | |
| Carboxymethylcellulose | 10 | parts by weight |
| Calcium chloride | 10 | parts by weight |
| Sodium metasilicate powder | 10 | parts by weight |
| Silicon dioxide | 5 | parts by weight |
| Calcium carbonate | 15 | parts by weight |
| Example 3 | | |
| Carboxymethylcellulose | 10 | parts by weight |
| Calcium chloride | 15 | parts by weight |
| Sodium metasilicate powder | 10 | parts by weight |
| Silicon dioxide | 100 | parts by weight |
| Calcium carbonate | 300 | parts by weight |

Figure 1:
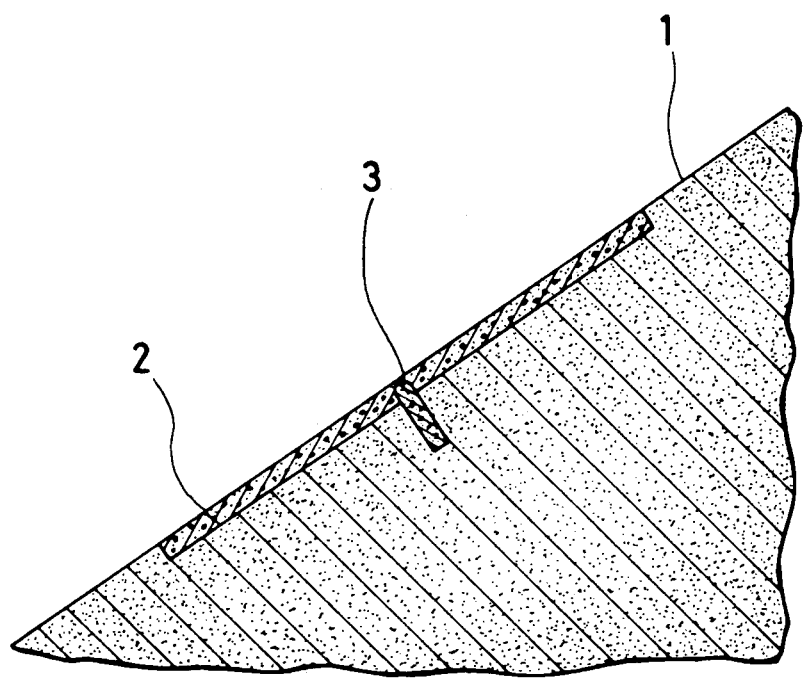
FIG. 1 is a cross-sectional view showing a method for preventing washout including a method of constructing a surface layer and a method of constructing an anchor according to the present invention.

Next, a method for preventing washout of soil and/or sand using the above coagulant will be described below:

As shown in FIG. 1, a square hole 2 having each side of 2 m and a depth of 10 cm is dug on a sloped ground 1 of the loamy layer of the Kanto District with an inclination of approximately 32 degrees. The soil extracted from the hole is uniformly put back into the square hole 2, thereafter 4 kg of the coagulant (Example 2) is uniformly scattered over the surface of the soil, and the soil and the coagulant (Example 2) are mixed sufficiently while sprinkling 12 liters of water by a sprinkler such as a watering pot.

The surface of the soil is then pounded by a concrete block having 10 kg so as to make a uniform level surface of the soil Thereafter, a square anchor hole 3 having each side of 20 cm and a depth of 50 cm is dug at a central portion of the square hole 2 by a scoop. 5 kg of the cement, 360 g of the coagulant (Example 1) and 9 liters of water are added to the soil extracted from the hole, and they are stirred and mixed sufficiently. The mixture of the soil, the cement, the coagulant and water is put back into the square anchor hole 3, and the surface of the mixture is pounded by the concrete block mentioned above.

Next, the test result of the construction site will be described below.

After 24 hours passed since the construction had finished, test pieces, each having each side of 50 cm and a thickness of 10 cm, were picked up from the locations of the square hole 2 and the square anchor hole 3. The compressive strength test was conducted by applying a uniaxial compressive load to the test pieces. The compressive strength test results of the test piece from the location of the square hole 2 was 0.6 kg/cm$^2$, and of the test piece from the location of the anchor hole 3 was 2.2 kg/cm$^2$. The boundary area of the location of the square hole 2 and the ground 1 was almost not changed in color.

Water under a pressure of 2.5 kg/cm$^2$ was sprayed on the boundary area of the location of the square hole 2 and the ground 1 by a water hose connected to a water supply for 30 minutes. The soil and sand of the ground 1 were worn away up to a depth of 3 cm and flowed away, but the soil and sand of the location of the square hole 2 was changeless. This test result proved the effect of preventing washout of the soil and sand.

Next, two square molds, each having each side of 2 m and a thickness of 10 cm, were placed on the slope ground 1. The fluid soil was prepared by premixing 25% of red soil mixed with clay, 25% of white quartz sand, 25% of red granular soil and 25% of loamy layer of the Kanto District, and by adding 45 parts by weight of water to the mixture and mixing them. The prepared fluid soil was poured into the two square molds.

Next, 5 kg of the coagulant (Example 3) was scattered over the soil in one of the square molds and mixed with the soil sufficiently using a scoop. Thereafter the soil including the coagulant was strongly pounded by the scoop, and left for 24 hours.

Thereafter, the two molds were removed and water having water pressure of 2.5 kg/cm$^2$ was sprayed on the soil for 10 minutes. The soil without the coagulant was worn away from the edge portions and flowed away, but the soil including the coagulant (Example 3) was not worn away and did not flow even by spraying water for 30 minutes.

Further, after 10 days passed since the construction had finished, the compressive strength test was conducted according to a standard method. The compressive strength test result of the test piece from the location of the anchor hole 3 was 22.3 kg/cm$^2$.

Consequently, the test result proved that the anchor using the present invention can be durably used as an anchor for preventing washout of the soil and/or sand of the surface layer.

Figure 2:
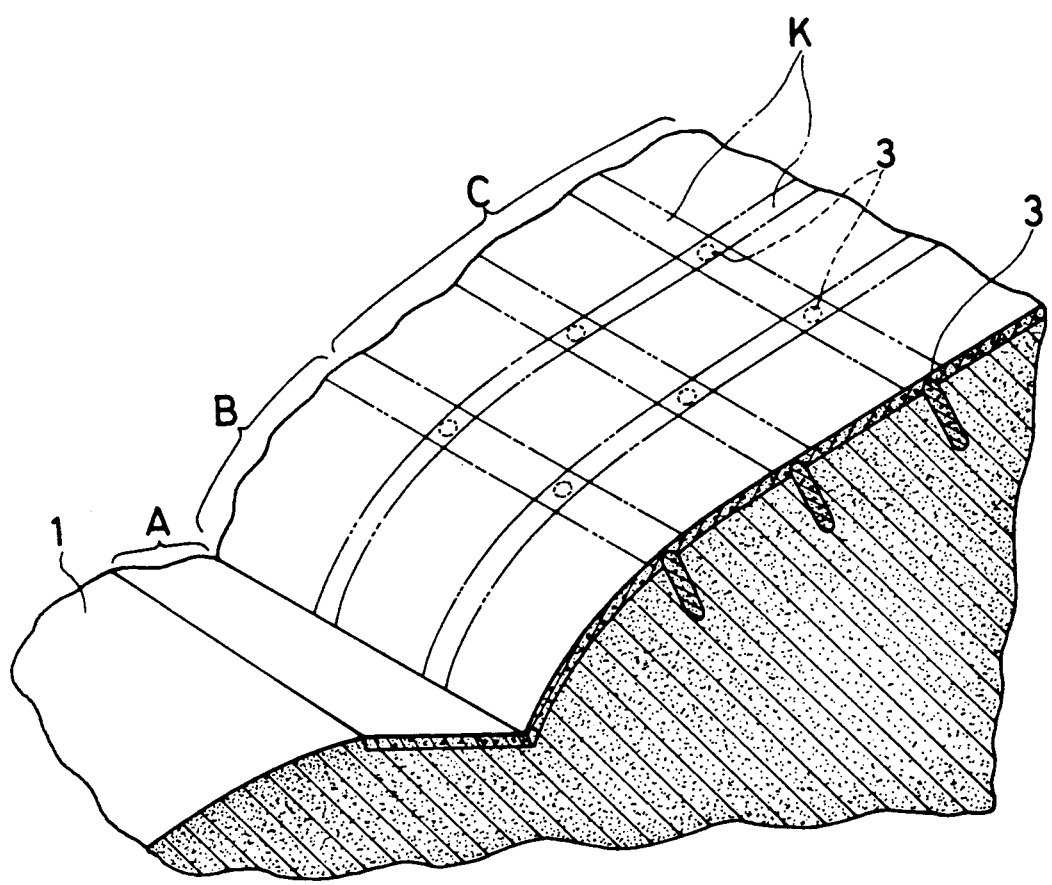
FIG. 2 is a perspective view showing several different methods of construction in accordance with different areas according to the present invention.

The method for preventing washout according to the present invention is applicable to the slope on a mountainside as shown in FIG. 2 on the basis of the test result.

In FIG. 2, areas A, B and C are shown as an unpaved road, a steep slope, and a slight slope, respectively.

600 to 4000 g of the coagulant (Example 3) per surface area of 1 m$^2$ of the soil is scattered over the soil, the soil is dug to a depth of 10 cm and mixed with the coagulant (Example 3) sufficiently. 4 to 5 liters of water per surface area of 1 m$^2$ of the soil is scattered over the soil, and pressure is applied to the surface of the soil by a pressure roller or the like. In case of necessity, 1 to 5 kg of portland cement per surface area of 1 m$^2$ of the soil is applied to a shoulder of the road and mixed with the soil.

When the area A is relatively flat, 1 to 2 kg of the coagulant per surface area of 1 m$^2$ of the soil is enough. In case of the angle of inclination of the area A exceeding 15 degrees, a quantity of the coagulant to be used in the area A as well as the shoulder of the road of the area A is increased, for example, to 4 kg per surface area of 1 $m^2$ of the soil, or 600 to 1000 g of the coagulant per surface area of 1 $m^2$ of the soil and 1 to 5 kg of the portland cement per surface area of 1 $m^2$ of the soil are used. When 3 to 5 kg of the portland cement per surface area of 1 $m^2$ of the soil is added to the soil, the soil has the same hardness as cement concrete does. Since the coagulant serves as an agent for coagulating cement and quickens coagulation of cement, the landslide can be effectively prevented and repaired in the rain. When the coagulant is used as the agent for coagulating cement, 2.5 to 4% of the coagulant is applied to 100 parts by weight of cement. Therefore, in the area which needs strength, a suitable quantity of cement is locally added to the area in accordance with a desired cement strength.

The area B is the slope with an inclination of 30 to 45 degrees. 600 g of the coagulant (Example 1) per surface area of 1 $m^2$ of the soil is scattered over the soil, and 5 to 24 kg of the portland cement per surface area of 1 $m^2$ of the soil is scattered over the soil in accordance with the quality of the soil. The soil is dug to a depth of 10 cm, and the soil, the coagulant and the portland cement are mixed sufficiently while scattering 4 to 5 liters of water per surface area of 1 $m^2$ of the soil.

When it is difficult to dig the soil by a machine, the soil should be manually dug using a scoop or scraped off to a thickness of 10 cm at every small area using a suitable scraper. The coagulant and the cement are added to the soil extracted from the area at the same rate as mentioned above and mixed with the soil while pouring water. Thereafter, the mixture of the soil, the coagulant, the cement and water is put back into the area scraped off. That is, the mixture is plastered to a thickness of 10 cm at the area scraped off. The other small areas scraped off are subjected to the same construction. This construction method is applicable to a temporary repair work of the landslide at a side wall of a road.

In the area C with an inclination of less than 30 degrees, even if a bulldozer or a stabilizer cannot be used on a mountainous region, a small farm tractor can be used to dig the soil to a depth of 10 cm. 2 to 4 kg of the coagulant (Example 2 or Example 3) per surface area of 1 $m^2$ of the soil is scattered over the soil, and if necessary, 3 to 10 kg of the portland cement per surface area of 1 $m^2$ of the soil is added and mixed with the soil sufficiently. Next, pressure is applied to the surface of the soil by a pressure roller or the like. In this case, since the soil surface hardens with mixing the portland cement, the portland cement is added to local areas K which are arranged in a striped pattern or a checked pattern formed by stripes, for example, with a width of 30 cm placed at 5 m intervals as shown in FIG. 2, thereby preventing the landslide of a surface layer having a vast area in the slope and decreasing damage to plants.

Next, a plurality of anchor holes 3 are formed at regular intervals (for example 5 m intervals) as shown in FIG. 2, and anchors are constructed by the same method as mentioned above. In this case, the depth and area of each anchor hole are determined by considering the intervals of the anchors, the inclination degree of the construction site, the construction area and the thickness of the layer having a tendency landslide. On the other hand, it becomes possible to prevent the landslide only by constructing the anchors without constructing the surface layer set forth above. Particularly, when the landslide is forecasted by a long rain, in the region concerned, anchor holes having a depth of 2 to 5 m are dug using a screw earth auger or the like. 200 kg of the portland cement and 6 to 8 kg of the coagulant (Example 1 or Example 3) per a volume of 1 $m^3$ of the soil extracted from the holes are added and mixed with the soil. The mixture of the soil, the portland cement and the coagulant is put back into the anchor holes and pressed by pressing means such as a pressure roller. Consequently, the locations of the anchors have 1.8 $kg/cm^2$ compressive strength within 24 hours. In other words, strong anchors are constructed in a short time according to the above construction method. Further, the construction is not attended with difficulty, even if it is raining.

Figure 3:
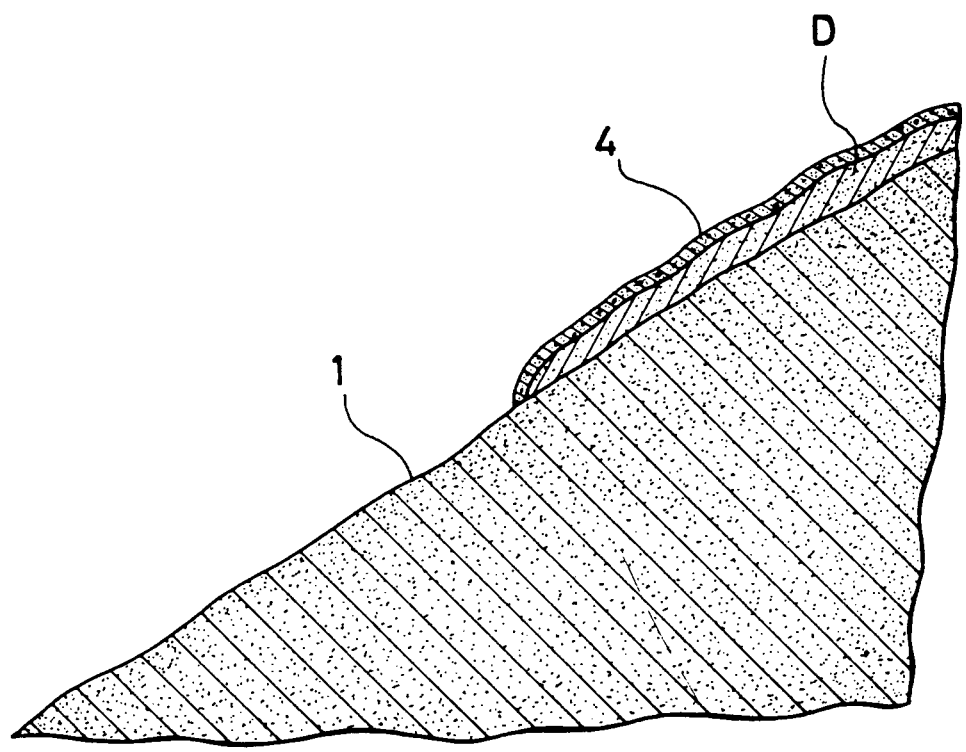
FIG. 3 is a cross-sectional view showing a method for preventing washout of the soil which lies on the slope.

FIG. 3 shows a mud accumulated area D on the slope. The mud in the mud accumulated area D is likely to flow downward.

In order to avoid such mud flow, if any emergency measure is needed, the following measures are taken.

(1) 20 kg of the coagulant (Example 3) per volume of 1 $m^3$ of the soil is added to the mud in the mud accumulated area D and mixed with the mud, and the mud accumulated area D is left. When the mud accumulated area D is of a small scale, the construction can be manually performed by a scoop. The mud in the mud accumulated area D is coagulated and has a water-resistance after 24 hours has passed, thereby preventing washout of the mud.

(2) In case that the mud accumulated area D has a large amount of mud, the portland cement can be used jointly with the coagulant. On the contrary, in case that the mud accumulated area D has a small amount of mud, only surface layer 4 of the accumulated mud is treated, thereby preventing washout of the mud.

(3) In order to effectively prevent washout of the mud in the mud accumulated area D semipermanently, the anchors as mentioned above are provided in the mud accumulated area D.

(4) When the mud accumulated area D has a thin and vast layer and the construction is troublesome, 1 to 3 kg of the coagulant (Example 2 or Example 3) per volume of 1 $m^3$ of the mud is scattered over the mud, so that the mud can be coagulated with the coagulant seeping naturally into the mud.

Incidentally, in all construction methods as mentioned above, the coagulant is brought into a solution using a proper quantity of water and this solution can be used.

According to the present invention, the following effects are attainable.

(1) When the coagulant including a lot of silicon dioxide and a lot of calcium carbonate is scattered over the soil and/or sand which flows easily by rain, and mixed with the soil and/or sand, washout of the soil and/or sand can be prevented promptly.

(2) When the coagulant and the cement are jointly used, even if the coagulant includes a little silicon dioxide and a little calcium carbonate, the coagulant effects a coagulating action by which the cement can be coagulated quickly. Therefore, the coagulant has effects on emergency measures or semipermanent measures.

(3) In the landslide region in which the soil of the surface layer flows for a certain thickness on the slope by containing water such as rain water, when the coagulant is mixed with the soil of the surface layer to a depth of 10 cm, penetration of rain water can be reduced, thus preventing the interior soil from containing water and flowing.

In the construction site, when the cement is used jointly with the coagulant in local areas in a checked or striped pattern, barriers which have the same hardness as concrete can be constructed in a short time at local areas without using molds for concrete.

(4) In a method in which anchor holes are formed in a construction site, the coagulant is solely mixed with the soil extracted from the hole or the coagulant and the cement are jointly mixed with the soil extracted from the hole, and the mixed soil is put back into the anchor holes. The anchor holes can be formed using a scoop in a small area at a steep slope, and barriers can be constructed by putting the soil extracted from the hole back into the anchor holes.

Although certain preferred embodiments have been shown and described, it should be understood that many changes and modifications may be made therein without departing from the scope of the appended claims.

What is claimed is:

1. A method for preventing washout of soil and/or sand using a coagulant, the method comprising the steps of:

preparing a coagulant by premixing approximately 10 parts by weight of each of carboxymethylcellulose, calcium chloride and sodium metasilicate powder, 0.3 to 10 parts by weight of silicon dioxide and 1 to 15 parts by weight of calcium carbonate;

scattering said coagulant over the surface of the soil and/or sand in a manner such that 360 to 1000 g of said coagulant is applied to a volume of surface area of 1 m² and a depth of 10 cm; and excavating said soil and/or sand to a depth of 5 to 20 cm and mixing said coagulant and said soil and/or sand while adjusting water content of said soil and/or sand in the range of 30 to 45%.

2. The method for preventing washout of soil and/or sand using a coagulant according to claim 1, further comprising the step of adding an adequate quantity of portland cement to said soil and/or sand in order to solidify a mixture of said soil and/or sand and said coagulant.

3. A method for preventing washout of soil and/or sand using a coagulant, the method comprising the steps of:

preparing a coagulant by premixing approximately 10 parts by weight of each of carboxymethylcellulose, calcium chloride and sodium metasilicate powder, 0.3 to 100 parts by weight of silicon dioxide and 1 to 300 parts by weight of calcium carbonate;

scattering said coagulant over the surface of the soil and/or sand in a manner such that 500 to 2000 g of said coagulant is applied to a volume of surface area of 1 m² and a depth of 10 cm;

scattering portland cement over the local area of the construction site in a manner such that 1 to 20 kg of said portland cement is applied to a volume of surface area of 1 m² and a depth of 10 cm; and excavating said soil and/or sand and mixing said coagulant, said portland cement and said soil and/or sand, while adjusting water content of said soil and/or sand in the range of 35 to 45% by sprinkling water, so as to form, as time elapses, high strength local area and low strength local area in said construction site.

4. A method for preventing washout of soil and/or sand using a coagulant, the method comprising the steps of:

excavating a plurality of anchor holes at certain intervals in the construction site;

adding portland cement to the soil and/or sand extracted from said holes in order to make a primary mixture in a manner such that 180 to 240 kg of said portland cement is applied to a volume of 1 m³ of said soil and/or sand;

adding a coagulant to said primary mixture in order to make a secondary mixture in a manner such that 5 to 7 kg of said coagulant is applied to a volume of said primary mixture including 1 m³ of said soil and/or sand and 180 to 240 kg of said portland cement, said coagulant being prepared by premixing approximately 10 parts by weight of each of carboxymethylcellulose, calcium chloride and sodium metasilicate powder, 0.3 to 5 parts by weight of silicon dioxide and 1 to 15 parts by weight of calcium carbonate; and putting back said secondary mixture into said anchor holes, while retaining water content of a volume of said secondary mixture including 1 m³ of said soil and/or sand, 180 to 240 kg of said portland cement and 5 to 7 kg of said coagulant in the range of 20 to 45 liters, in order to solidify said secondary mixture as time elapses.

* * * * *